United States Patent
Wang

(10) Patent No.: US 9,421,862 B2
(45) Date of Patent: Aug. 23, 2016

(54) REAR AXLE DIFFERENTIAL DEVICE OF VEHICLE

(71) Applicant: Zhejiang Xinyang Industry Co., Ltd., Jinhua, Zhejiang Province (CN)

(72) Inventor: Heyuan Wang, Jinhua (CN)

(73) Assignee: ZHEJIANG XINYANG INDUSTRY CO., LTD., Jinhua, Zhejiang Province (CN)

( * ) Notice: Subject to any disclaimer, the term of this patent is extended or adjusted under 35 U.S.C. 154(b) by 55 days.

(21) Appl. No.: 14/476,343

(22) Filed: Sep. 3, 2014

(65) Prior Publication Data

US 2016/0031320 A1 Feb. 4, 2016

(30) Foreign Application Priority Data

Jul. 31, 2014 (CN) .......................... 2014 1 0370515

(51) Int. Cl.
| | |
|---|---|
| F16H 48/08 | (2006.01) |
| B60K 17/346 | (2006.01) |
| F16H 48/42 | (2012.01) |
| F16H 57/037 | (2012.01) |
| B60K 17/348 | (2006.01) |

(52) U.S. Cl.
CPC .............. *B60K 17/346* (2013.01); *F16H 48/42* (2013.01); *F16H 57/037* (2013.01); *B60K 17/348* (2013.01); *F16H 48/08* (2013.01); *F16H 2048/082* (2013.01)

(58) Field of Classification Search
CPC .... B60K 17/348; B60K 17/346; F16H 48/42; F16H 48/08; F16H 2048/082; F16H 57/037
USPC ....... 74/606 R; 475/220, 230, 72, 74, 83, 200
See application file for complete search history.

(56) References Cited

U.S. PATENT DOCUMENTS

| | | | | |
|---|---|---|---|---|
| 5,257,962 A | * | 11/1993 | Martin ................... | B60K 17/00 180/378 |
| 2005/0023885 A1 | * | 2/2005 | Bennett .................... | B60K 6/48 301/124.1 |
| 2005/0124450 A1 | * | 6/2005 | Gady ....................... | B60K 1/02 475/5 |
| 2006/0270509 A1 | * | 11/2006 | Pinkos .................... | F16H 48/08 475/220 |
| 2006/0283319 A1 | * | 12/2006 | Garlick ................... | F16H 48/08 91/499 |
| 2009/0325754 A1 | * | 12/2009 | Shibagaki ............... | F16H 48/08 475/220 |
| 2010/0022345 A1 | * | 1/2010 | Reaser .................... | F16D 55/36 475/241 |
| 2015/0137586 A1 | * | 5/2015 | Bassi .................... | B60K 17/346 301/137 |

\* cited by examiner

*Primary Examiner* — Roger Pang
(74) *Attorney, Agent, or Firm* — Muncy, Geissler, Olds & Lowe, P.C.

(57) ABSTRACT

A rear axle differential device of a vehicle, including a differential casing, two half-shafts, an input shaft, and an output shaft is provided. The differential casing includes a first casing and a second casing. A differential gear is disposed in the second casing having two coaxial half-shaft holes at two ends. The two half-shafts are coaxially fixed to the two half-shaft holes, respectively, and a direction of an axis of the half-shaft is a first direction. One end of the input shaft is fixed to the first casing, and the other end extends towards the second casing. The output shaft is located at one side of the input shaft, and one end is fixed to the first casing and the other end extends along a direction opposite to an extending direction of the input shaft. The axis of the output shaft is parallel to the axis of the input shaft.

8 Claims, 3 Drawing Sheets

US 9,421,862 B2

REAR AXLE DIFFERENTIAL DEVICE OF VEHICLE

CROSS-REFERENCE TO RELATED APPLICATIONS

This Non-provisional application claims priority under 35 U.S.C. §119(a) on Patent Application No(s). 201410370515.0 filed in Republic of China on Jul. 31, 2014, the entire contents of which are hereby incorporated by reference.

BACKGROUND OF THE INVENTION

1. Field of the Invention

This invention relates to a vehicle field and, more particularly, to a rear axle differential device of a vehicle.

2. Description of the Related Art

A differential gear is a main part of a drive axle and is used for allowing half-shafts at two sides to rotate at different speeds when transmitting power to the half-shafts at two sides, to satisfy unequal-distance drive of two wheels in a pure-rolling mode, thereby reducing friction between tires and the ground. Therefore, the characteristic that the two wheels at two sides of the drive axle of a vehicle rotate at different speeds when the routes are not equal can be ensured, further to satisfy requirements of vehicle kinesiology.

At present, most vehicles are two-wheel drive vehicles, such as front-wheel drive vehicles or rear-wheel drive vehicles. Therefore, conventional engines mostly match the two-wheel drive vehicles. However, since all-terrain vehicles used outdoors, such as off-road vehicles and utility vehicles, need good cross-country performance (such as grade climbing or wading), and the common two-wheel drive vehicles are easy to skid, the all-terrain vehicles, such as the off-road vehicles and the utility vehicles, are usually set to be four-wheel drive.

Since the present two-wheel drive mostly adopts a front-wheel drive layout, and the engine is disposed in the front part of the vehicle and is connected with a front axle. However, in a four-wheel drive all-terrain vehicle, the engine needs to be connected with a rear axle. At present, the engines on the market cannot match the rear axle of the all-terrain vehicle. If a mold is made again specially for producing the engines, a long research and development period is needed and the research and development costs are high.

BRIEF SUMMARY OF THE INVENTION

To overcome deficiencies of the prior art, this invention provides a rear axle differential device of a vehicle.

This invention provides a rear axle differential device of a vehicle, including a differential casing, two half-shafts, an input shaft, and an output shaft. The differential casing includes a first casing and a second casing. A differential gear is disposed in the second casing, and the second casing has two coaxial half-shaft holes at two ends. The two half-shafts are coaxially fixed to the two half-shaft holes, respectively, and a direction of an axis of the half-shaft is a first direction. One end of the input shaft is fixed to the first casing, and the other end extends towards the second casing. The axis of the input shaft is vertical to an end face of the first casing, and the input shaft is connected with the differential gear via a transmission element disposed in the first casing. The output shaft is located at one side of the input shaft, and one end is fixed to the first casing and the other end extends along a direction opposite to an extending direction of the input shaft. The axis of the output shaft is parallel to the axis of the input shaft, and a direction of the axis of the output shaft is a second direction orthogonal to the first direction. A scalar component of a distance between the axis of the input shaft and the axis of the output shaft in the first direction is within the range from 124 mm to 154 mm. A scalar component of a distance between the axis of the input shaft and the axis of the output shaft in a third direction orthogonal to the first direction and the second direction is within the range from 96 mm to 126 mm. A scalar component of a distance between the end face of the first casing and the axis of the half-shaft in the second direction is within the range from 159 mm to 189 mm. A scalar component of a distance between the axis of the output shaft and the axis of the half-shaft in the third direction is within the range from 33 mm to 43 mm.

In one embodiment of the invention, the scalar component of the distance between the axis of the input shaft and the axis of the output shaft in the first direction may be within the range from 134 mm to 144 mm.

In one embodiment of the invention, the scalar component of the distance between the axis of the input shaft and the axis of the output shaft in the third direction may be within the range from 106 mm to 116 mm.

In one embodiment of the invention, the scalar component of the distance between the end face of the first casing and the axis of the half-shaft in the second direction may be within the range from 169 mm to 179 mm.

In one embodiment of the invention, both the input shaft and the output shaft may be involute spline shafts or rectangular spline shafts.

In one embodiment of the invention, a front mounting support may be disposed at an upper part of the first casing, and a scalar component of a distance between a top end face of the front mounting support and the axis of the half-shaft in the third direction may be within the range from 133 mm to 143 mm.

In one embodiment of the invention, a hollow cylindrical mounting lug may be disposed at an outer side of the second casing along a direction of the axis of the half-shaft, the axis of the mounting lug may be parallel to the axis of the half-shaft, a projection length of the mounting lug in the first direction may be within the range from 70 mm to 80 mm, and a scalar component of a distance between the axis of the mounting lug and the axis of the half-shaft in the second direction may be within the range from 90 mm to 100 mm.

In one embodiment of the invention, a scalar component of a distance between the axis of the output shaft and an end face of the half-shaft hole close to the output shaft in the first direction may be within the range from 29 mm to 39 mm.

To sum up, compared with the prior art, the rear axle differential device of the vehicle in the invention has the following advantages.

According to the rear axle differential device of the vehicle in the invention, the scalar component of the distance between the axis of the input shaft and the axis of the output shaft in the first direction is within the range from 124 mm to 154 mm, the scalar component of the distance between the axis of the input shaft and the axis of the output shaft in the third direction orthogonal to both the first direction and the second direction is within the range from 96 mm to 126 mm, the scalar component of the distance between the end face of the first casing and the axis of the half-shaft in the second direction is within the range from 159 mm to 189 mm, and the scalar component of the distance between the axis of the output shaft and the axis of the half-shaft in the third direction is within the range from 33 mm to 43 mm. The positions of the input shaft and the output shaft are changed, thus to avoid interference between a transmission shaft and an engine, greatly increasing power transmitting performance and using lifetime of an all-terrain vehicle. Better matching may be realized without any modification on the conventional engine, and the assembling cost may be greatly reduced.

In addition, since the vehicle may be influenced by the terrain in the process of movement, the body of the vehicle may vibrate, and the vibration may drive the transmission shaft to vibrate. Both the input shaft and the output shaft can be involute spline shafts or rectangular spline shafts, thus to allow the input shaft and the output shaft to draw back along a length direction of the transmission shaft when relative rotation happened, thereby matching the vibration of the vehicle when transmitting the torque. Meanwhile, to firmly connect a chassis of the vehicle, the front mounting support is disposed at the upper part of the first casing, and the hollow cylindrical mounting lug is further disposed at the outer side of the second casing along the direction of the axis of the half-shaft.

These and other features, aspects, and advantages of the present invention will become better understood with regard to the following description, appended claims, and accompanying drawings.

DETAILED DESCRIPTION OF THE INVENTION

Figure 1:
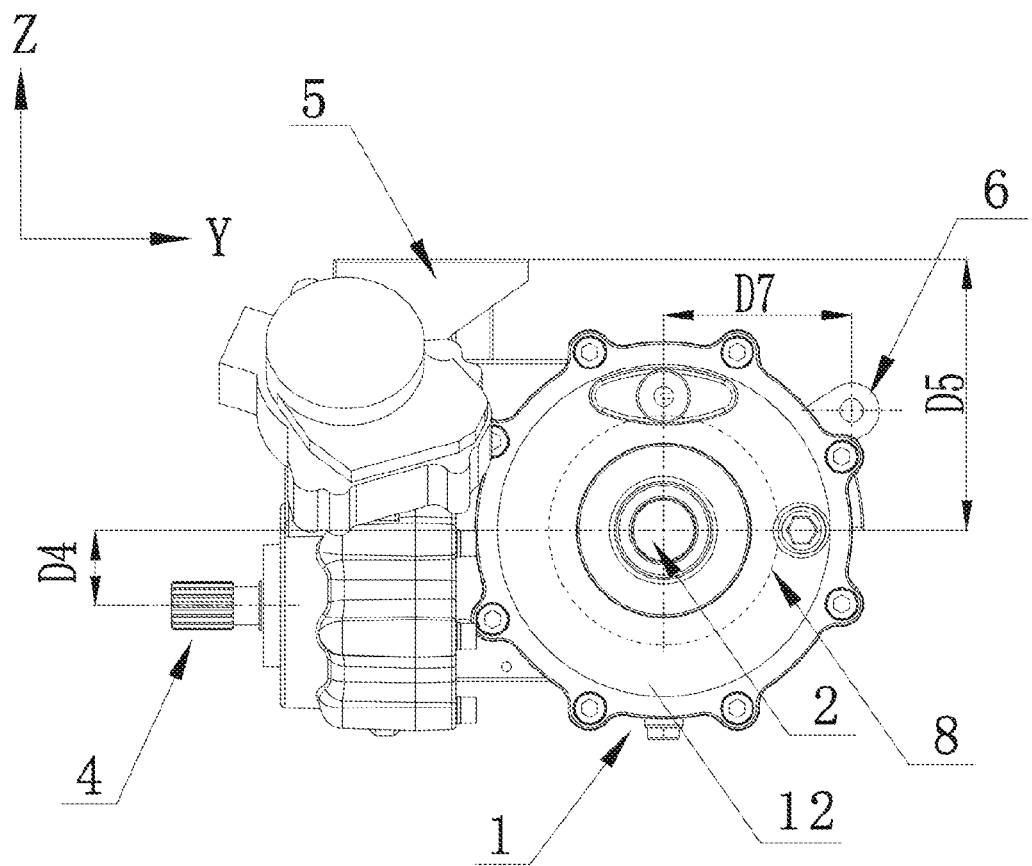
FIG. 1 is a front view showing a rear axle differential device of a vehicle according to one embodiment of the invention.
Figure 2:
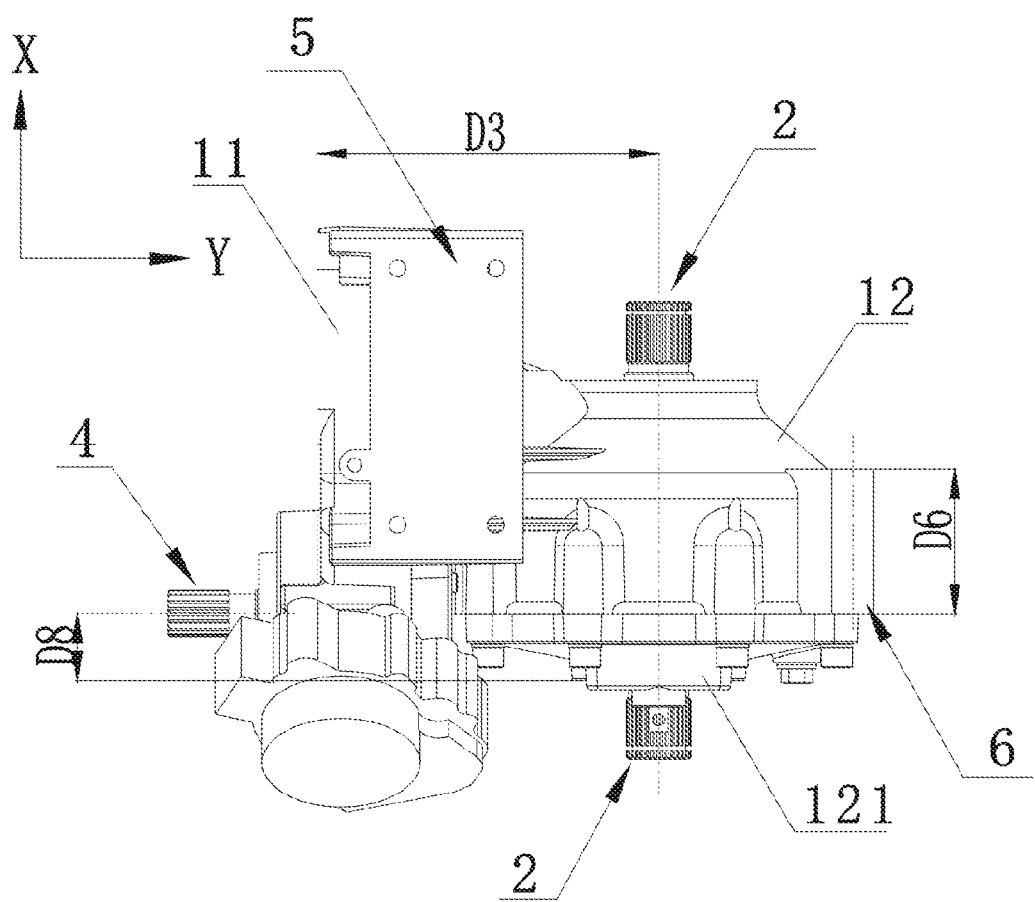
FIG. 2 is a top view showing the rear axle differential device of the vehicle in FIG. 1.
Figure 3:
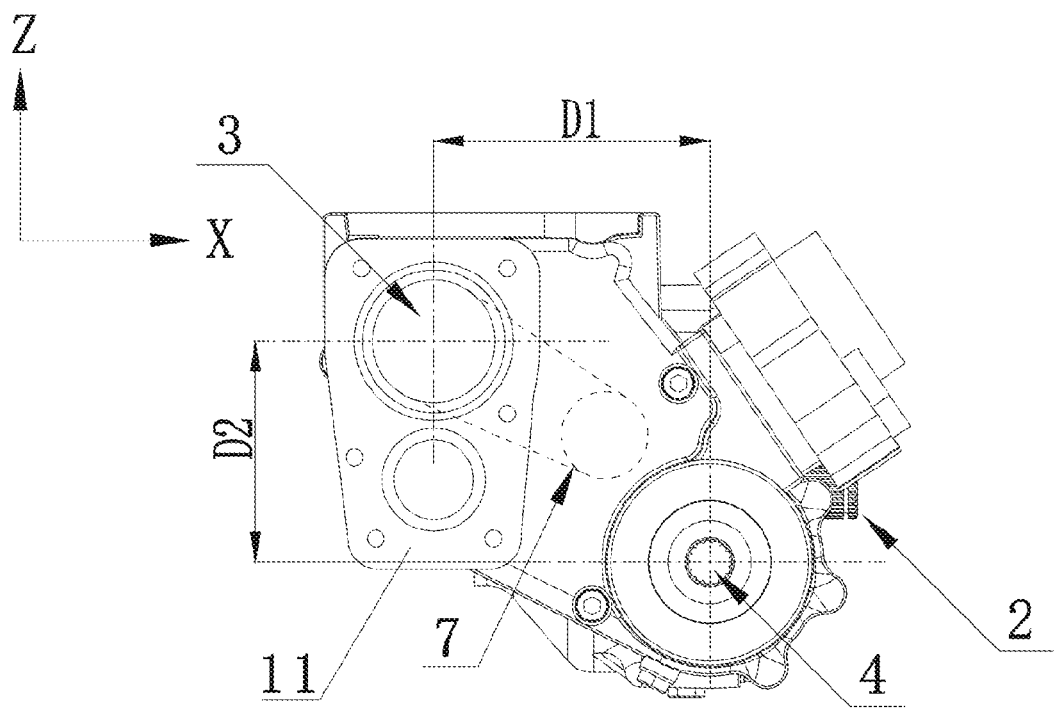
FIG. 3 is a left view showing the rear axle differential device of the vehicle in FIG. 1.

FIG. 1 is a front view showing a rear axle differential device of a vehicle according to one embodiment of the invention. FIG. 2 is top view showing the rear axle differential device of the vehicle in FIG. 1. FIG. 3 is a left view showing the rear axle differential device of the vehicle in FIG. 1. Please refer to FIG. 1 to FIG. 3 together.

A rear axle differential device of a vehicle in the embodiment includes a differential casing 1, two half-shafts 2, an input shaft 3, and an output shaft 4. The differential casing 1 includes a first casing 11 and a second casing 12. A differential gear 8 is disposed in the second casing 12, and the second casing 12 has two coaxial half-shaft holes 121 at two ends. The two half-shafts 2 are coaxially fixed to the two half-shaft holes 121, respectively, and a direction of an axis of the half-shaft 2 is a first direction (the direction of X axis in FIG. 2 and FIG. 3). One end of the input shaft 3 is fixed to the first casing 11, and the other end extends towards the second casing 12. An axis of the input shaft 3 is vertical to an end face of the first casing 11, and the input shaft 3 is connected with the differential gear 8 via a transmission element 7 in the first casing 11. The output shaft 4 is located at one side of the input shaft 3, and one end is fixed to the first casing 11 and the other end extends along a direction opposite to the extending direction of the input shaft 3. An axis of the output shaft 4 is parallel to the axis of the input shaft 3, the direction of the axis of the output shaft 4 is a second direction (the direction of Y axis in FIG. 1 and FIG. 2), and the second direction is orthogonal to the first direction.

A scalar component D1 of a distance between the axis of the input shaft 3 and the axis of the output shaft 4 in the first direction is within the range from 124 mm to 154 mm. A scalar component D2 of a distance between the axis of the input shaft 3 and the axis of the output shaft 4 in a third direction (the direction of Z axis in FIG. 1 and FIG. 3) orthogonal to both the first direction and the second direction is within the range from 96 mm to 126 mm. A scalar component D3 of a distance between the end face of the first casing 11 and the axis of the half-shaft 2 in the second direction is within the range from 159 mm to 189 mm. A scalar component D4 of a distance between the axis of the output shaft 4 and the axis of the half-shaft 2 in the third direction is within the range from 33 mm to 43 mm.

An all-terrain vehicle is a vehicle suitable for driving on all terrain. Since the driving environment is mostly complex and precipitous terrain, the requirements of the cross-country performance and safe performance of the vehicle are very high. The conventional two-wheel drive (front wheel drive or rear wheel drive) has smaller driving force and the weaker grade climbing performance, failing to satisfy the demands of the all-terrain vehicle. Therefore, almost all of the all-terrain vehicles adopt four-wheel drive.

In the four-wheel drive, power output by an engine is connected to the input shaft 3 via a transmission shaft, and the input shaft 3 transmits the power to the differential gear 8 in the second casing 12 by shifting the transmission element 7 in the first casing 11. After the differential gear 8 distributes the power, the power is output to the transmission shaft connected with a front axle via the output shaft 4, thus to drive a front wheel connected with the front axle. Meanwhile, the differential gear 8 further transmits the power to the two half-shafts 2 disposed at the left and right half-shaft holes 121 and connected with a rear wheel, thus to transmit the power to the rear wheel, thereby realizing the four-wheel drive.

Most of the present vehicles (such as cars, trucks, and buses) are two-wheel drive vehicles and adopt front wheel drives, that is, the engine is connected with the front axle thus to drive the front wheel. Therefore, at present, almost all the engines on the market are designed to match the front axle. However, since the all-terrain vehicles adopt the four-wheel drive, the engine needs to transmit power with the rear axle. Therefore, how to realize the power transmission between the two is a key to improve the power performance of the whole vehicle.

In the embodiment, by setting the size between the input shaft 3 and the output shaft 4 and the distance between the output shaft 4 and the half-shafts 2 of the rear axle differential device of the vehicle, the rear axle differential device of the vehicle is allowed to match the conventional engine thus to realize stable power transmission. The perfect matching between the engine and the rear axle can be realized without any modification on the conventional engine by a user, thereby greatly reducing manufacturing cost of the four-wheel drive all-terrain vehicles.

Preferably, the scalar component D1 of the distance between the axis of the input shaft 3 and the axis of the output shaft 4 in the first direction may be within the range from 134 mm to 144 mm, and the scalar component D2 in the third direction orthogonal to both the first direction and the second direction may be within the range from 106 mm to 116 mm. The scalar component D3 of the distance between the end face of the first casing 11 and the axis of the half-shaft 2 in the second direction is set to be within the range from 169 mm to 179 mm. In the embodiment, the scalar component D1 of the distance between the axis of the input shaft 3 and the axis of the output shaft 4 in the first direction is 139 mm, and the scalar component D2 in the third direction orthogonal to the first direction and the second direction is 111 mm. The scalar component D3 of the distance between the end face of the first casing 11 and the axis of the half-shaft 2 in the second direction is set to be 174 mm. The scalar component D4 of the distance between the axis of the output shaft 4 and the axis of the half-shaft 2 in the third direction is 38 mm.

By assembling the rear axle differential device of the vehicle in the embodiment of the invention, the all-terrain vehicle still has good vehicle power performance after a test of thirty thousand kilometers. However, the invention is not limited thereto.

To realize the stable connection between the rear axle differential device of the vehicle and a chassis and to prevent the rear axle differential device of the vehicle from separating from the chassis caused by violent vibration when driving on rugged mountainous regions, in the embodiment, a front mounting support 5 is disposed at an upper part of the first casing 11, and a scalar component D5 of a distance between a top end face of the front mounting support 5 and the axis of the half-shaft 2 in the third direction is within the range from 133 mm to 143 mm. Further, a hollow cylindrical mounting lug 6 is disposed at an outer side of the second casing 12 along a direction of the axis of the half-shaft 2. The axis of the mounting lug 6 is parallel to the axis of the half-shaft 2, a projection length D6 of the mounting lug 6 in the first direction is within the range from 70 mm to 80 mm, and a scalar component D7 of the distance between the axis of the mounting lug 6 and the axis of the half-shaft 2 in the second direction is within the range from 90 mm to 100 mm. In the embodiment, D5 is 138 mm, D6 is 74 mm, and D7 is 95 mm. However, the invention is not limited.

In the embodiment, to further improve the matching degree of the engine and the rear axle, a scalar component D8 of a distance between the axis of the output shaft 4 and an end face of the half-shaft hole 121 close to the output shaft 4 in the first direction is within the range from 29 mm to 39 mm. Preferably, D8 may be 34 mm.

In addition, to further improve the transmission balancing degree of the transmission shaft, both the input shaft 3 and the output shaft 4 are involute spline shafts or rectangular spline shafts. The spline shaft can further move along a length direction of the transmission shaft during rotation and match the vibration of the vehicle when transmitting torque, thus to realize stable and balanced power transmission. In the embodiment, both the input shaft 3 and the output shaft 4 are involute spline shafts. However, the invention is not limited.

In the embodiment, to further improve the whole performance of the vehicle, the differential gear 8 includes a driven bevel gear and a planetary gear connected with the driven bevel gear, and a driving bevel gear matching the driven bevel gear is disposed at a tail end of the transmission element 7. The bevel gears can suffer great loads, work stably, and produce small noise and vibration when running at a high speed.

To sum up, according to the rear axle differential device of the vehicle in the embodiment of the invention, the scalar component D1 of the distance between the axis of the input shaft 3 and the axis of the output shaft 4 in the first direction is within the range from 124 mm to 154 mm, the scalar component D2 of the distance between the axis of the input shaft 3 and the axis of the output shaft 4 in the third direction orthogonal to both the first direction and the second direction is within the range from 96 mm to 126 mm, the scalar component D3 of the distance between the end face of the first casing 11 and the axis of the half-shaft 2 in the second direction is within the range from 159 mm to 189 mm, and the scalar component D4 of the distance between the axis of the output shaft 4 and the axis of the half-shaft 2 in the third direction is within the range from 33 mm to 43 mm. The positions of the input shaft 3 and the output shaft 4 are changed, thus to avoid interference between the transmission shaft and the engine, greatly increasing power transmitting performance and using lifetime of the all-terrain vehicle. Better matching may be realized without any modification on the conventional engine, and the assembling cost may be greatly reduced.

In addition, since the vehicle may be influenced by the terrain in the process of movement, the body of the vehicle may vibrate, and the vibration may drive the transmission shaft to vibrate. Both the input shaft 3 and the output shaft 4 can be involute spline shafts or rectangular spline shafts, thus to allow the input shaft 3 and the output shaft 4 to draw back along the length direction of the transmission shaft when relative rotation happened, thereby matching the vibration of the vehicle when transmitting the torque. Meanwhile, to firmly connect the chassis of the vehicle, the front mounting support 5 is disposed at the upper part of the first casing 11, and the hollow cylindrical mounting lug 6 is further disposed at the outer side of the second casing 12 along the direction of the axis of the half-shaft 2.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A rear axle differential device of a vehicle comprising:
a differential casing including a first casing and a second casing, a differential gear being disposed in the second casing, the second casing having two coaxial half-shaft holes at two ends;
two half-shafts coaxially fixed to the two half-shaft holes, respectively, a direction of an axis of the half-shafts being a first direction;
an input shaft with one end fixed to the first casing and the other end extending towards the second casing, an axis of the input shaft being vertical to an end face of the first casing, the input shaft being connected with the differential gear via a transmission element disposed in the first casing;
an output shaft located at one side of the input shaft and with one end fixed to the first casing and the other end extending along a direction opposite to an extending direction of the input shaft, an axis of the output shaft being parallel to the axis of the input shaft, a direction of the axis of the output shaft being a second direction, the second direction being orthogonal to the first direction;
wherein a scalar component of a distance between the axis of the input shaft and the axis of the output shaft in the first direction is within the range from 124 mm to 154 mm, a scalar component of the distance between the axis of the input shaft and the axis of the output shaft in a third direction orthogonal to the first direction and the second direction is within the range from 96 mm to 126 mm, a scalar component of a distance between the end face of the first casing and the axis of the half-shaft in the second direction is within the range from 159 mm to 189 mm, and a scalar component of a distance between the axis of the output shaft and the axis of the half-shaft in the third direction is within the range from 33 mm to 43 mm, and
wherein the axis of the input shaft and the axis of the output shaft are provided on different sides of the axis of the half-shafts in the third direction.

2. The rear axle differential device of the vehicle according to claim 1, wherein the scalar component of the distance between the axis of the input shaft and the axis of the output shaft in the first direction is within the range from 134 mm to 144 mm.

3. The rear axle differential device of the vehicle according to claim 1, wherein the scalar component of the distance between the axis of the input shaft and the axis of the output shaft in the third direction is within the range from 106 mm to 116 mm.

4. The rear axle differential device of the vehicle according to claim 1, wherein the scalar component of the distance between the end face of the first casing and the axis of the half-shaft in the second direction is within the range from 169 mm to 179 mm.

5. The rear axle differential device of the vehicle according to claim 1, wherein both the input shaft and the output shaft are involute spline shafts or rectangular spline shafts.

6. The rear axle differential device of the vehicle according to claim 1, wherein a front mounting support is disposed at an upper part of the first casing, and a scalar component of a distance between a top end face of the front mounting support and the axis of the half-shaft in the third direction is within the range from 133 mm to 143 mm.

7. The rear axle differential device of the vehicle according to claim 1, wherein a hollow cylindrical mounting lug is disposed at an outer side of the second casing along a direction of the axis of the half-shaft, an axis of the mounting lug is parallel to the axis of the half-shaft, a projection length of the mounting lug in the first direction is within the range from 70 mm to 80 mm, and a scalar component of a distance between the axis of the mounting lug and the axis of the half-shaft in the second direction is within the range from 90 mm to 100 mm.

8. The rear axle differential device of the vehicle according to claim 1, wherein a scalar component of a distance between the axis of the output shaft and an end face of the half-shaft hole close to the output shaft in the first direction is within the range from 29 mm to 39 mm.

* * * * *